Aug. 11, 1942.    G. A. LYON    2,293,007
WHEEL STRUCTURE
Filed Jan. 20, 1940
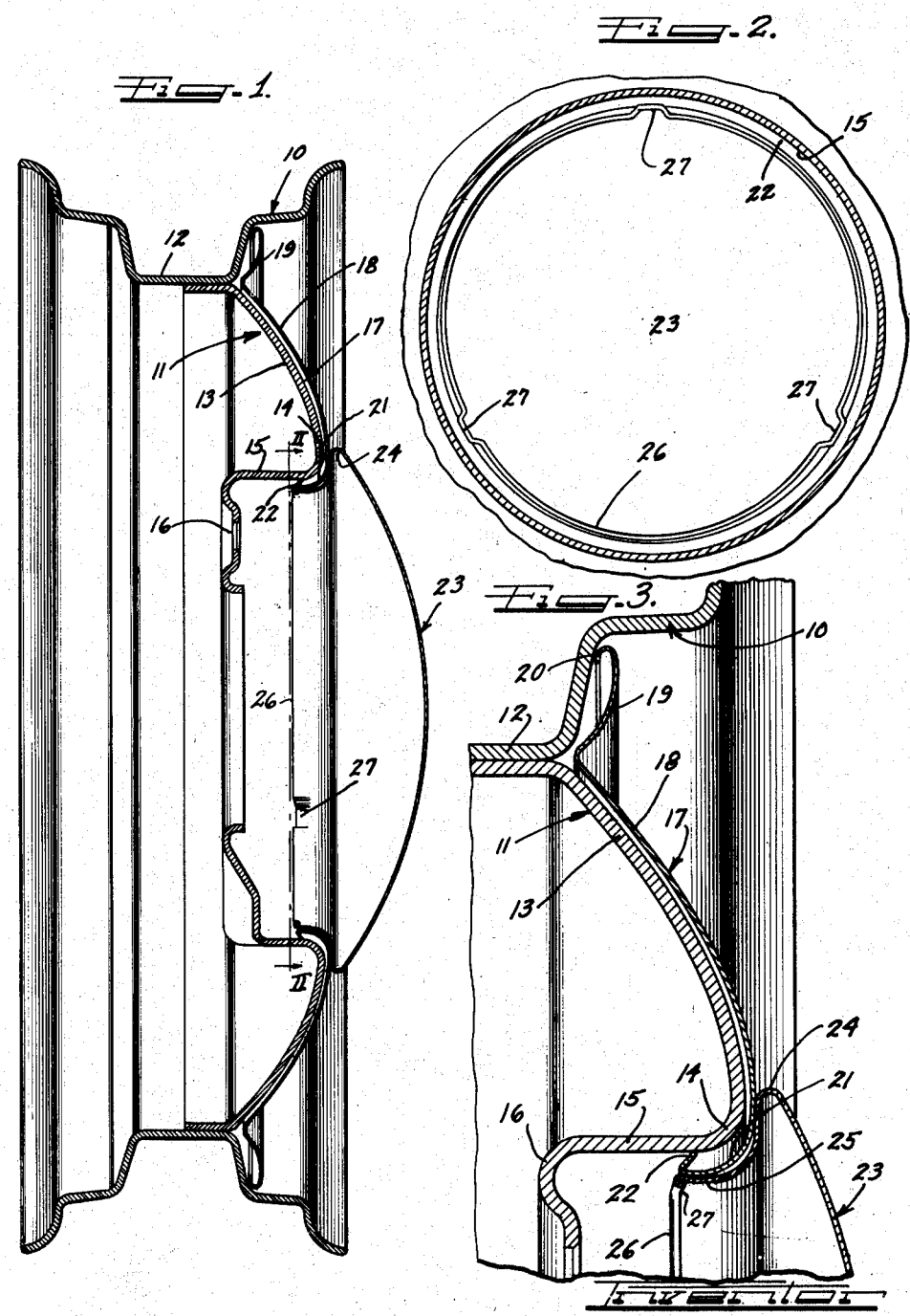
George Albert Lyon.

Patented Aug. 11, 1942

2,293,007

UNITED STATES PATENT OFFICE 2,293,007

WHEEL STRUCTURE

George Albert Lyon, Allenhurst, N. J.

Application January 20, 1940, Serial No. 314,820

5 Claims. (Cl. 301—37)

This invention relates to a wheel structure and more particularly to an ornamental cover or trim member in cooperation therewith.

An object of this invention is to provide an improved way of securing an ornamental cover or trim member to the body or rim part of a wheel.

Still another object of this invention is to provide a wheel structure wherein the ornamental member serves as a seat for retaining cooperation with the central hub cap on the wheel.

In accordance with the general features of this invention, there is provided a wheel including rim and body members and a circular cover for disposition over a portion of the outer side of said wheel of convex cross section and having an underturned continuous flexible circular flange, one of the members having a bulged portion forming a corner extending into the interior of the convex cover, with said flange on one side thereof and in resilient retaining engagement with an adjoining portion of the cooperating wheel member and with another portion of said cover on the opposite side of said corner, whereby said cover extends around and to both sides of said corner.

Still another feature of the invention relates to the forming of the cover member so as to have a central opening in which is snapped a hub cap disposed in detachable engagement with an inner marginal portion of the cover member.

A still further feature of the invention relates to the utilization of the inner edge of the cover member to provide an inturned or undercut shoulder against which a plurality of spaced protuberances arranged in a common circle on a flexible edge of a hub cap are adapted to be pressed to stress the edge of the cap and to thus retain the cap in position on the wheel.

Other objects and features of this invention will more fully appear from the following detailed description taken in connection with the accompanying drawing which illustrates several embodiments thereof, and in which:

Figure 1 is a vertical cross sectional view taken through one form of my invention;

Figure 2 is a fragmentary side view partly in section, taken on the line II—II of Figure 1 looking in the direction indicated by the arrows; and Figure 3 is an enlarged cross sectional view corresponding to a portion of the upper part of Figure 1.

As shown on the drawing:

The reference character 10 designates generally a drop center type of tire rim to the base flange 12 of which is attached a wheel body or spider part 11. The body part 11 includes a bulged portion 13 terminating in a rounded nose or corner 14, which serves as the junction between the bulged curved portion 13 and an axially extending portion 15. The portion 15 is connected to it and at right angles thereto a fastening flange 16 by means of which the wheel is fastened in the usual way to a suitable support. As is well known, the method of fastening involves the use of a plurality of fastening bolts or cap screws which may be five in number as is the present practice.

This wheel member which has been described thus far, as is well known, is made of metal. The tire rim 10 is usually rolled, whereas the body part 11 comprises a stamping.

Cooperating with this wheel is a circular cover member 17 in the form of an annulus which is made of suitable metallic sheet and may be blanked on suitable press equipment. This cover member or annulus 17 is of convex cross sectional shape and, as will be perceived from Figures 1 and 3, is generally of the same contour as the associated wheel parts or members.

The member 17 includes a bulged portion 18 disposed over the bulged portion 13 of the wheel member 11 and a marginal or ring portion 19 disposed over a portion of one of the flanges of the tire rim member 10. The outer edge of this portion 19 is turned as indicated at 20 to provide a blunt edge and also to reinforce the edge so that it will better resist indentation from the force of a pry-off tool. That is to say, it is this edge against which the end of a suitable pry-off tool is applied for the purpose of prying loose the member 17 from the wheel. This edge may be disposed in close proximity to the adjoining portion of the tire rim part 10, or it may, if it is so desired, be disposed in actual contact therewith.

The wheel cover member 17 also includes a rounded or curved portion 21 disposed radially inward of the bulged portion 18. This rounded portion is of convex cross sectional shape and extends around the nose or corner 14 of the wheel body member 11. In other words, the rounded portion or corner 14 of the wheel body member telescopes or is nested inside of the portion 21 of the cover member.

This portion 21 terminates in an underturned continuous flexible circular flange 22 disposed at an oblique angle, as shown in Figure 3, and adapted to have biting engagement with the portion 15 of the wheel member 11—or, in other words, with a portion of the member 11 on one side of the corner 14. Thus, the cover member 17 extends clear around the sides of the corner 14 and cooperates with both of these sides.

The obliquely inclined flange 22 by reason of the fact that it extends radially and axially outward is adapted to be pressed easily into position on the flange portion 15 of the wheel member 11 but is adapted to resist displacement. This arrangement is such that any tendency to dislodge the biting edge of the flange 22 from its retaining or gripping cooperation with the wheel enhances the gripping engagement.

The curved or bulged portion 21 of the cover member 17 provides an annular undercut shoulder which not only defines a central opening in the wheel assembly but in addition serves as a means for retaining cooperation with a central hub cap 23. This hub cap 23 may be made of any suitable material, such for example as sheet metal, and is generally in the form of a dished body. The central portion of the cover member is bulged outwardly and terminates at its marginal portion in a turned edge 24 adapted to bear against an adjoining portion of the wheel cover member 17. The turned edge 24, in turn, is connected to an inwardly and rearwardly extending curved skirt 25 on the hub cap, which skirt is generally of the same configuration as the rounded portion 21 of the wheel cover member 17. The innermost extremity of this concavely curved skirt 25 terminates in a turned or beaded edge 26 which is continuous and is adapted to have resilient retaining cooperation with an inner extremity of the portion 21 of the cover member 17. This engagement takes place directly radially inwardly of the point of engagement of the flange 22 with the portion 15 of the body member 11.

In order to provide for the stressing of the continuous flexible edge 26 of the hub cap 23, the edge 26 is provided at equidistantly spaced points with three protuberances 27 (Figure 2), each of which is adapted to bear against the portion 25 of the wheel member 17 directly over the flange 22.

The three protuberances are normally arranged in a common circle the diameter of which is slightly greater than the inside diameter of the curved portion 21 of the cover member 17. As a consequence, when the hub cap is pressed axially into position in the central opening defined by the cover member 17, the three protuberances stress or deflect the continuous edge 27, so that this edge is buckled under stress and applies a hub cap retaining pressure against the undercut inner extremity of portion 21 of the cover member 17.

From the foregoing, it is of course evident that I have provided a cover member which is curved so as to extend around and to opposite sides of a corner on a wheel member, and which is in a snap-on retaining engagement with one of these sides. In addition, I have utilized a portion of the cover member on one side of this corner of the wheel member to serve as a seat for the hub cap 23 and to retainingly cooperate in the retention of the hub cap in position on the wheel centrally of the annular cover member.

I claim as my invention:

1. In combination, a wheel including rim and body members and a circular cover for disposition over a portion of the outer side of said wheel, said cover being of convex cross section and having an underturned continuous flexible circular flange, one of said wheel members having a bulged portion forming a corner extending into the interior of said convex cover member with said flange on one side thereof and in resilient retaining engagement with an adjoining portion of the cooperating wheel member, another portion of said cover member being on the opposite side of said corner whereby said cover member extends around said corner, said underturned flange being inclined outwardly in both axial and radial directions so that said cover member may be pressed over said corner and whereby thereafter any tendency to dislodge the edge of said flange from retaining cooperation with the wheel causes said flange to flex in a rearward direction behind and away from the interior of said convex cover and thus enhances its gripping engagement.

2. In combination, a wheel including rim and body members and a circular cover for disposition over a portion of the outer side of said wheel, said cover being of convex cross section and having an underturned continuous flexible circular flange, one of said wheel members having a bulged portion forming a corner extending into the interior of said convex cover member with said flange on one side thereof with an edge in resilient retaining engagement with an adjoining portion of the cooperating wheel member, another portion of said cover member being on the opposite side of said corner whereby said cover member extends around said corner, said cover member comprising an annulus having a central opening, and a hub cap snapped into retaining and detachable engagement with an inner marginal portion of said annulus, said marginal portion being spaced from said bulged portion and thus providing a resiliently supported and adjusted seat for said cap regardless of the position of said edge with respect to the cooperating wheel member.

3. In combination, a wheel including rim and body members and a circular cover for disposition over a portion of the outer side of said wheel having an underturned continuous flexible circular flange, one of said members having a bulged portion embraced by said cover and by said flexible flange, said flexible flange being at an inner margin of said cover and defining a circular central opening, and a hub cap snapped into retaining and detachable engagement with an inner marginal portion of said cover inside said opening, adjacent and directly opposite the point of resilient bearing of said flange against said wheel, said marginal portion being spaced from the bulged portion thus to provide a yieldably supported seat for said hub cap regardless of the position of said edge on the cooperating wheel member.

4. As an article of manufacture, a wheel cover of convex cross section and having an underturned continuous flexible circular flange adapted to embrace a portion of a wheel, said cover comprising an annulus with said flange on the inner peripheral margin thereof and said flange being inclined outwardly toward the outer periphery of the cover and having both radial and axial extent so that said cover may be pressed into retaining cooperation with a portion of a wheel and whereby any tendency to dislodge the edge of said flange from retaining cooperation with the wheel enhances its gripping engagement, said inclined flange being flexible and having a wheel engaging edge spaced rearwardly from the body of the cover.

5. As an article of manufacture, a wheel cover of convex cross section and having an underturned continuous flexible circular flange adapted to embrace a portion of a wheel, said cover comprising an annulus with said flange on the inner peripheral margin thereof and said flange being inclined outwardly toward the outer periphery of the cover and having both radial and axial extent so that said cover may be pressed into retaining cooperation with a portion of a wheel and whereby any tendency to dislodge the edge of said flange from retaining cooperation with the wheel enhances its gripping, engagement, said inclined flange being flexible and having a wheel engaging edge spaced rearwardly from the body of the cover, said flange being adapted to resiliently and adjustably grip the wheel and being of such configuration as to provide a seat for a hub cap in the center of said annulus regardless of the resiliently adjusted position of said flange on the wheel.

GEORGE ALBERT LYON.